J. V. ROBINSON.
AUTOMATIC TRAIN PIPE COUPLING.
APPLICATION FILED DEC. 20, 1912. RENEWED SEPT. 13, 1917.
1,245,779.
Patented Nov. 6, 1917.
2 SHEETS—SHEET 1.
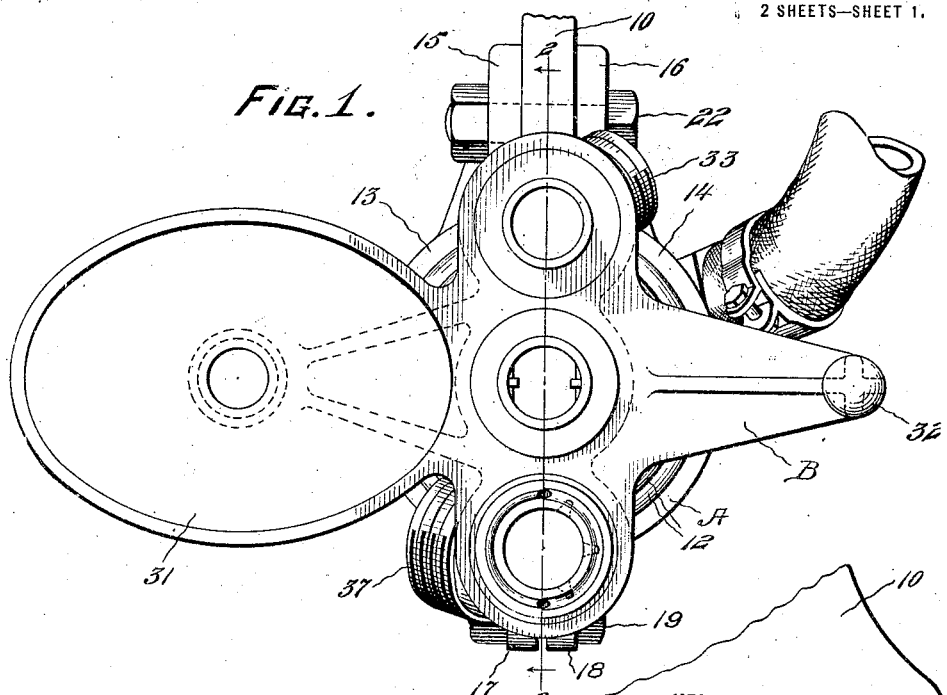
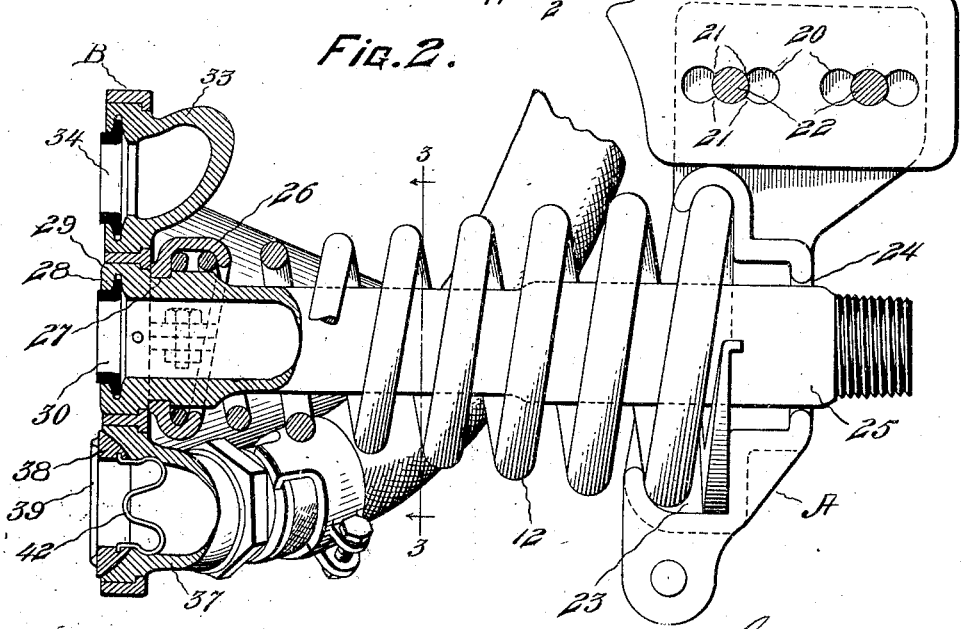

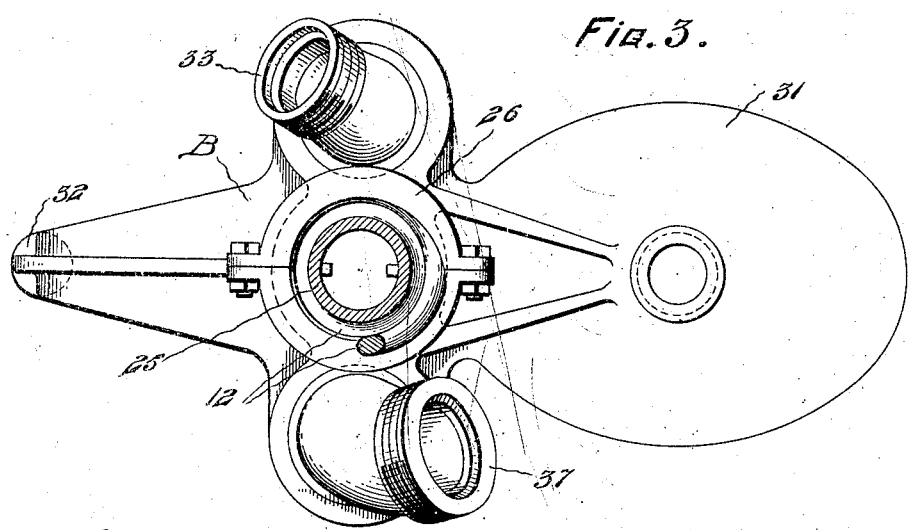
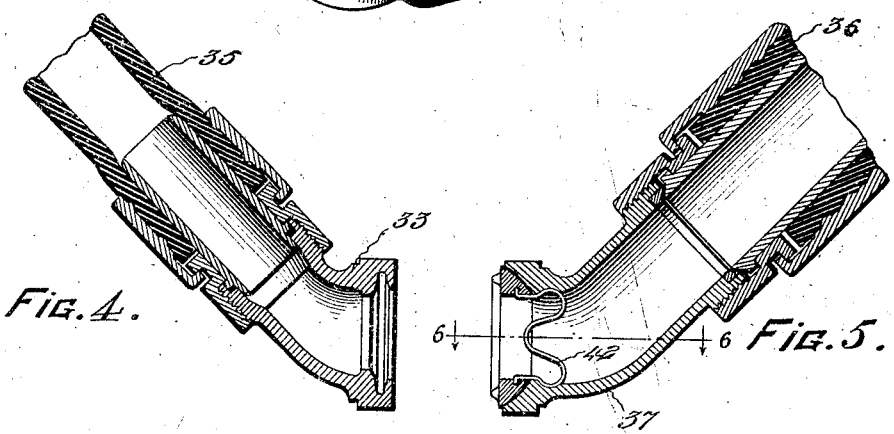
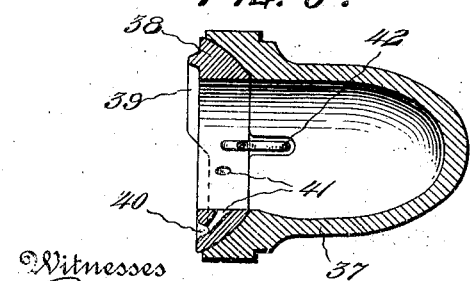
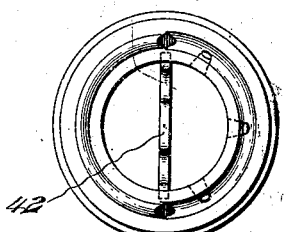

UNITED STATES PATENT OFFICE.

JOSEPH V. ROBINSON, OF BRANFORD, CONNECTICUT.

AUTOMATIC TRAIN-PIPE COUPLING.

1,245,179.   Specification of Letters Patent.   Patented Nov. 6, 1917.

Application filed December 20, 1912, Serial No. 737,892. Renewed September 13, 1917. Serial No. 191,306.

*To all whom it may concern:*

Be it known that I, JOSEPH V. ROBINSON, a citizen of the United States, and resident of Branford, in the county of New Haven, State of Connecticut, have invented certain new and useful Improvements in Automatic Train-Pipe Couplings, of which the following is a specification.

The present invention relates to couplers for automatically connecting the steam and air pipes of railway cars when coupling the cars together. The object of the invention is to improve and simplify the structure of such couplers and to render them efficient and durable. The various improvements constituting the invention will be described in detail in connection with the accompanying drawings, in which, Figure 1 is a face view of a complete coupling member or coupler;

Fig. 2 is a central sectional view on the line 2—2 of Fig. 1, some parts being shown in side elevation;

Fig. 3 is a rear view partly in section on the line 3—3 of Fig. 2, the hose sections being disconnected from the nipples;

Fig. 4 is a section through the upper nipple and hose connection;

Fig. 5 is a corresponding section through the lower nipple and hose connection;

Fig. 6 is a section on the line 6—6 of Fig. 5;

Fig. 7 is a face view of the steam connection shown in Fig. 6.

Referring to the drawings, 10 indicates a bracket depending from the draw head of the car, or other suitable support, and A indicates the base which carries the coupler supporting spring 12. The base comprises two mated parts 13, 14, having lugs 15, 16, which are fitted to opposite sides of the bracket 10 and the lugs 17, 18, which are perforated and adapted to be connected together by a bolt 19. The bracket 10 is provided with a pair of slots 20, the walls of which have inward projections or ribs 21 to prevent the bolts 22 from shifting longitudinally of the slots. These bolts pass through openings in the lugs 15, 16, and connect the lugs securely to the brackets. It will be seen that the slots 20 permit of a longitudinal adjustment of the base A and the coupler on the bracket and provide for securing the base in any desired position. The base A has cast in it a suitable socket 23 to receive and hold the end coil of the supporting spring 12. This spring is placed in the socket, in assembling the two parts of the base, and securely held in position by the bolts 19 and 22.

The base is provided with a central opening 24 through which loosely extends the brake air connecting pipe 25. The forward end of this pipe is closely surrounded, and supported, by the forward and smaller end of the spring 12. As shown in Figs. 2 and 3, the forward end coil of the spring is housed in a two-part collar 26, the two parts of the collar being secured together by a bolt and the forward end or flange of the collar being seated in an annular recess 27 in the pipe 25 which secures it against longitudinal movement on the pipe. It will be seen that the pipe 25 is thus flexibly supported on the base A with freedom of its forward end to move rearward, or lateral in any direction, the opening 24 in the base being sufficiently large to permit of all necessary lateral movement in coupling.

A coupling head B is carried by the forward end of the pipe 25. As shown in Fig. 2 the pipe is fitted securely in a central circular opening in the coupler head and locked therein by the collar 26. The forward end of the pipe 25 projects slightly beyond the face of the coupling head B and is provided with a flat face 28 which coöperates with the like face of an opposing coupler; and it is also provided with a round corner 29 upon which the opposing coupler may rock slightly to permit the steam and signal air gaskets to seat properly. In addition to the face 28 the brake air pipe 25 is provided also with a rubber or other yielding gasket 30, which is air-extended radially into tight contact with the walls of said pipe when abutting a corresponding member of a counterpart coupling; this being accomplished by the air pressure in the pipe 25.

The coupler head B is provided with suitable guiding means such as the funnel 31 and the pin 32. In the upper end of the coupler head is a circular opening in which is securely fitted a nipple 33 having its face flush with the face of the coupler head and having a flexible gasket 34 which projects slightly from the face. To the rear of this nipple 33 is connected the hose 35 which carries the signal air, or fluid for any other desired purpose, as shown in Fig. 4.

The steam pipe line is connected by means of hose 36 with a specially constructed nipple 37 shown in Figs. 2, 5, 6 and 7. This nipple is seated in a circular opening at the lower side of the coupler head B. In its face is a metal gasket 38 which is permitted to yield slightly, having a universal bearing in the nipple. The front face of the gasket is provided with a semi-circular rib 39 and a semi-circular groove 40, the rib and groove extending around the gasket and being located at about the middle of its face. The rib and groove are so situated that they will mate respectively with the groove and rib of an opposing steam coupler, thus making a steam tight joint. I preferably provide several small holes 41 extending inward from the groove 40 for the purpose of clearing out any dirt which may tend to accumulate in the grooves. Thus if there is any dirt or other obstruction in the groove the opposing rib will not fit into it closely, permitting the steam to leak slightly through the openings 41 until the steam has cleared away the obstruction. The gasket 38 is held yieldingly in its position by a spring retainer 42. The gasket 37 preferably projects slightly from the nipple, and beyond the face of the coupler head, practically to the same extent as the face 28 of the pipe 25. The faces of opposing coupler heads do not actually contact, but they contact at points only, the main bearing points between opposing couplers being the gaskets 38, the faces 28 of pipes 25 and the flexible gaskets 30 and 34.

One important feature of my invention is the fact that the nipples 33 and 37, if worn or damaged, can be removed from the coupler head and replaced without removing the coupler or even the coupler head from the car. Furthermore by removing the collar 26 the main pipe 25 can be withdrawn from the coupler and easily replaced if worn or damaged.

Some of the novel features of the construction and arrangement of parts hereinbefore described and not specifically included in the following claims are described and claimed in a co-pending application filed March 18, 1914, Serial No. 825,632.

Having described my invention what I claim and desire by Letters Patent is:

1. In an automatic train pipe connector, the combination with a support, of a coupling head having a plurality of vertically alined openings, and an air tight nipple removably mounted in each of said openings and carrying a gasket in the forward end.

2. In an automatic train pipe connector, the combination with a support, of a coupling head carried by said support and provided with a plurality of openings that extend through the face thereof adapted to substantially abut against a corresponding face on a mating head, and a nipple removably mounted in and extending through each of said openings, each nipple being provided with a gasket at the end thereof in the plane of the contact face of the head and adapted to be connected with a train pipe hose.

3. In an automatic train pipe connector, the combination with a coupling head provided with a plurality of openings that extend through the face thereof adapted to be positioned parallel to a corresponding face of a mating head, a nipple extending through each of said openings and having a portion thereof in rear of the head deflected laterally and adapted to be connected with a train pipe hose, and a gasket seated in the other end of each nipple.

In testimony whereof I affix my signature in presence of two witnesses.

JOSEPH V. ROBINSON.

Witnesses:
ROBT. T. LANG,
J. A. WATSON.